United States Patent [19]

Keefer et al.

[11] 3,754,883

[45] Aug. 28, 1973

[54] GLASS TUBE FORMING APPARATUS AND METHOD

[75] Inventors: George E. Keefer; Yu K. Pei, both of Toledo, Ohio

[73] Assignee: Owens-Illinois, Inc., Toledo, Ohio

[22] Filed: May 19, 1971

[21] Appl. No.: 144,973

[52] U.S. Cl............................ 65/88, 65/191, 65/192
[51] Int. Cl............................................. C03b 15/14
[58] Field of Search .................... 65/86, 88, 83, 85, 65/188, 191, 192

[56] References Cited
UNITED STATES PATENTS

| 1,894,201 | 1/1933 | Salomon | 65/88 |
| 3,419,376 | 12/1968 | Austin | 65/86 X |
| 3,401,028 | 9/1968 | Morrill, Jr. | 65/88 X |

FOREIGN PATENTS OR APPLICATIONS

| 660,433 | 2/1929 | France | 65/191 |
| 972,085 | 5/1959 | Germany | 65/191 |
| 675,700 | 7/1952 | Great Britain | 65/188 |

Primary Examiner—Arthur D. Kellogg
Attorney—E. J. Holler and Charles S. Lynch

[57] ABSTRACT

An improved process and apparatus for forming glass tubes or rods from a readily devitrifiable glass composition by an updraw process in which molten glass at a controlled temperature flows inwardly over the periphery of a rotating pan to form a shallow pool therein. The rotating pan has a central cone around which the root of the glass tube is formed, the tube being drawn upwardly by overhead draw rolls which rotate concentrically and in synchronism therewith. The wall thickness and diameter of the tube being drawn is controlled, in part at least, by maintaining with extreme accuracy the difference in level between the point of glass introduction into the pan and the point of the tube withdrawal. Preferably, the level of glass in the pan is controlled by allowing molten glass to spill over the edge of the pan. Preferably, the pan is heated by combustion burners playing on the pan, and flame shield is interposed in the path of the flames, the heat and the shield maintaining an exact temperature differential between the body of glass and the glass at the tube-forming central portion of the pan.

16 Claims, 10 Drawing Figures

United States Patent [19]
Keefer et al.
[11] 3,754,883
[45] Aug. 28, 1973
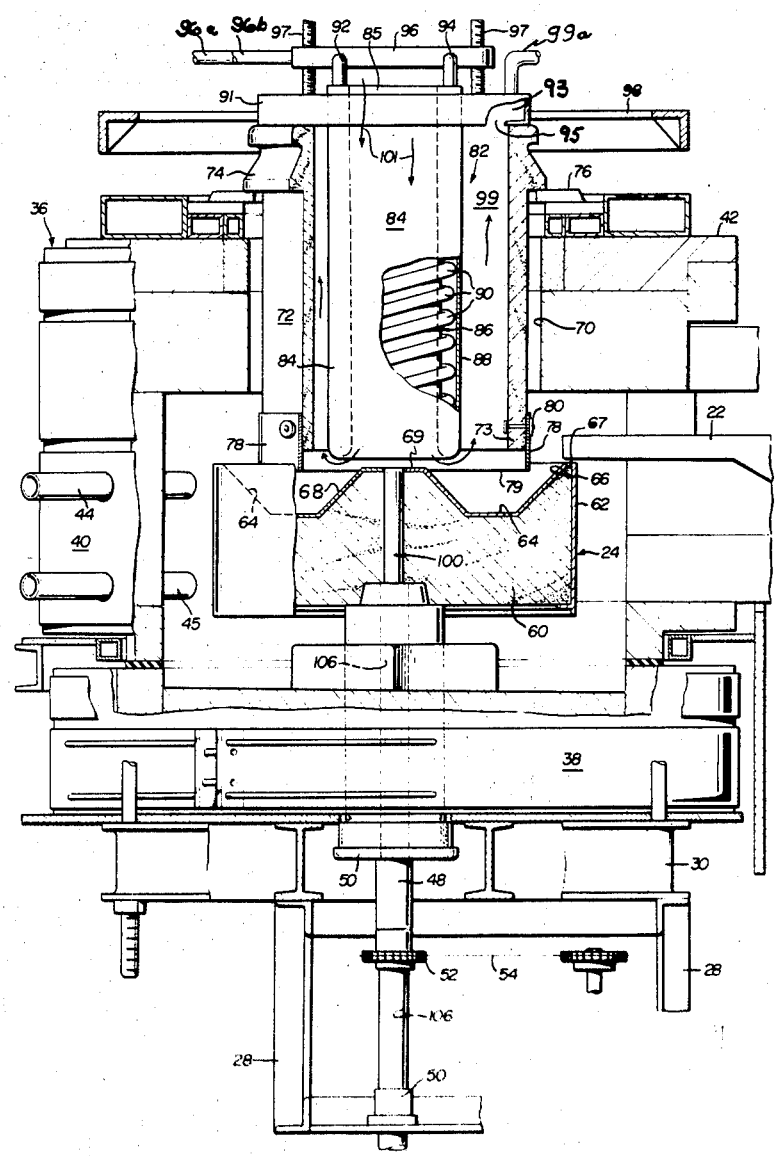

3,754,883

INVENTORS:
GEORGE E. KEEFER, GYU K. PEI
BY E.J. Holler &
Charles S. Lynch
ATT'YS.

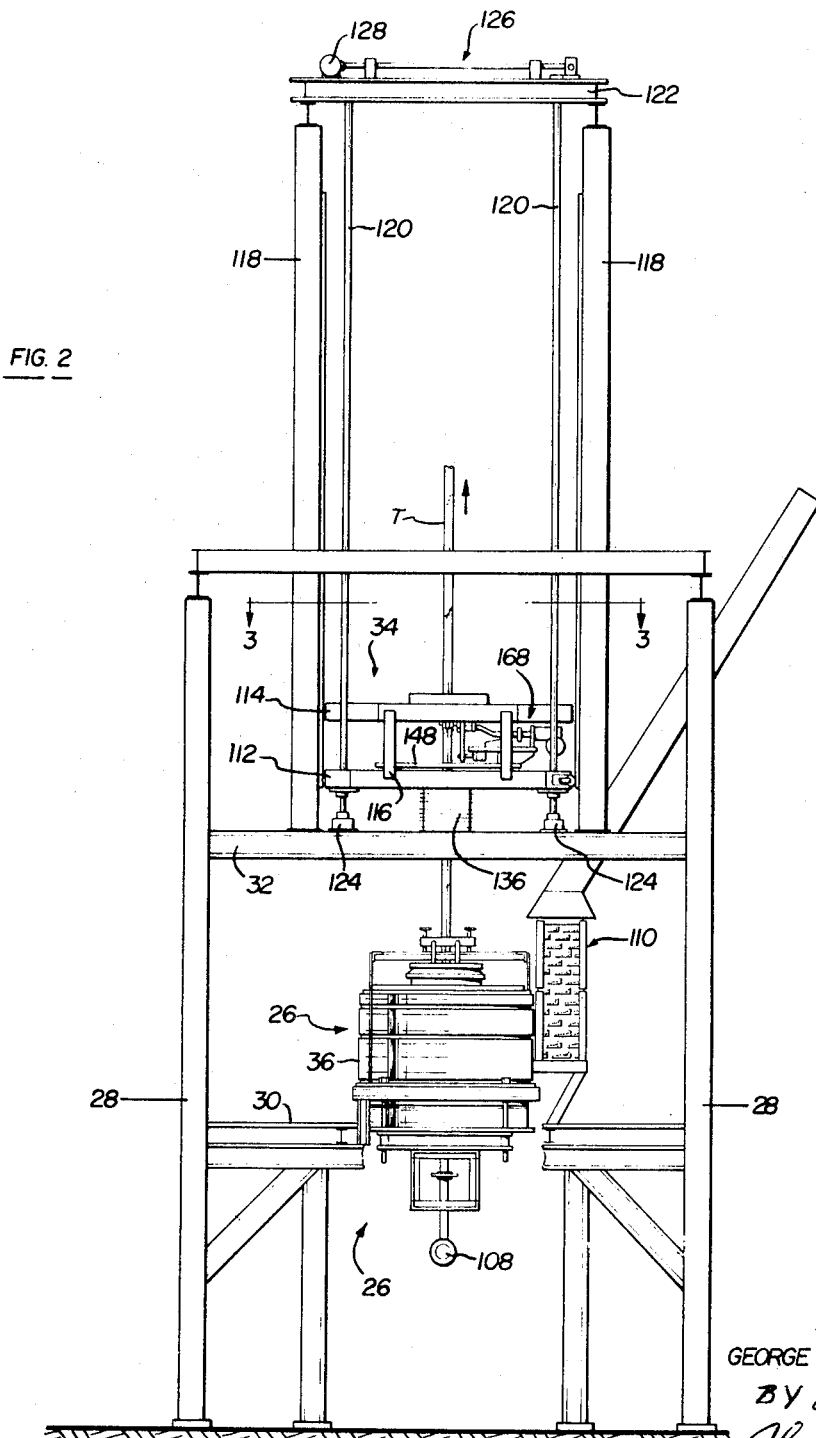

INVENTORS
GEORGE E. KEEFER & YU K. PEI
BY E. J. Holler &
Charles S. Lynch
ATT'YS.

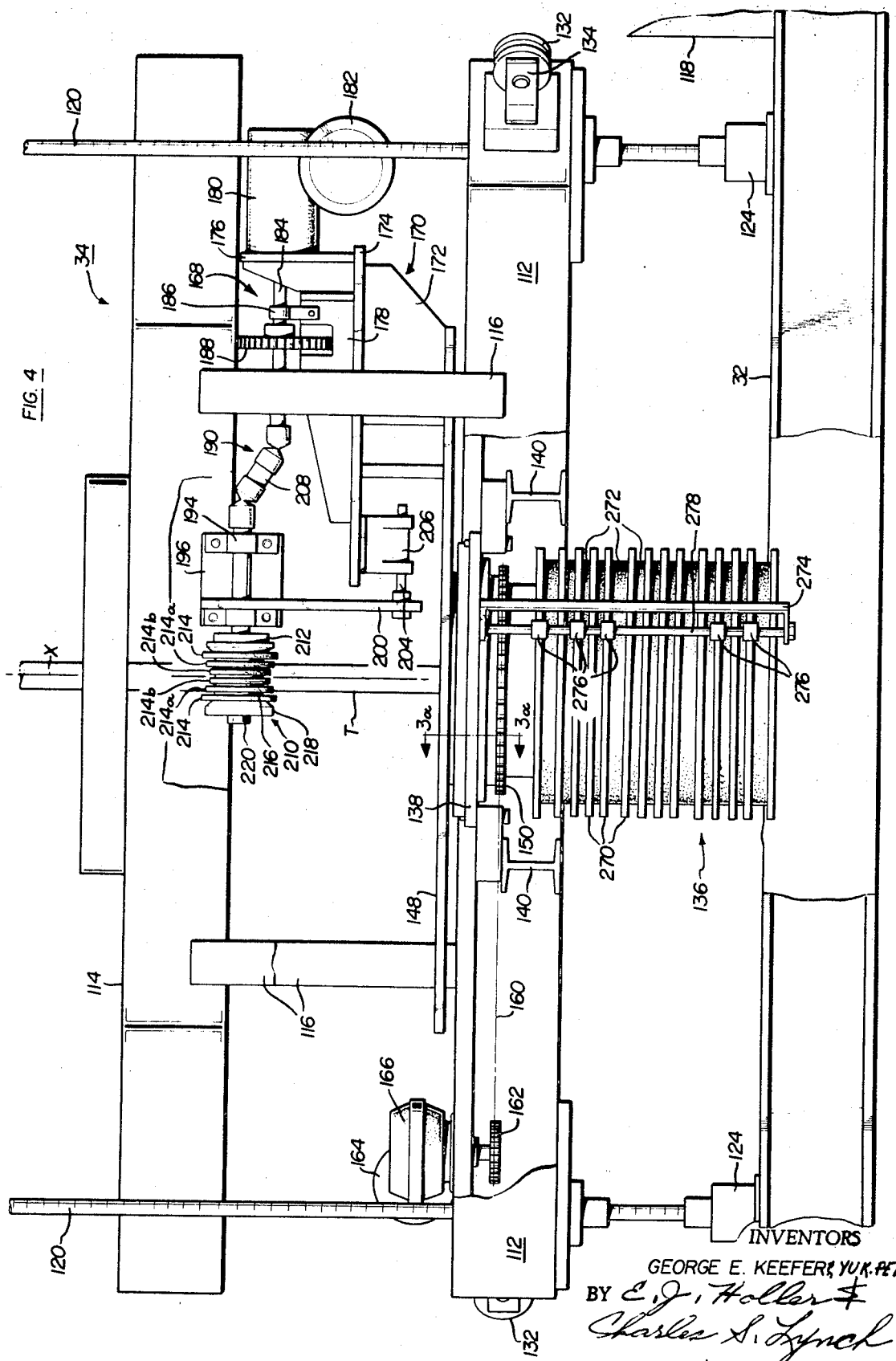

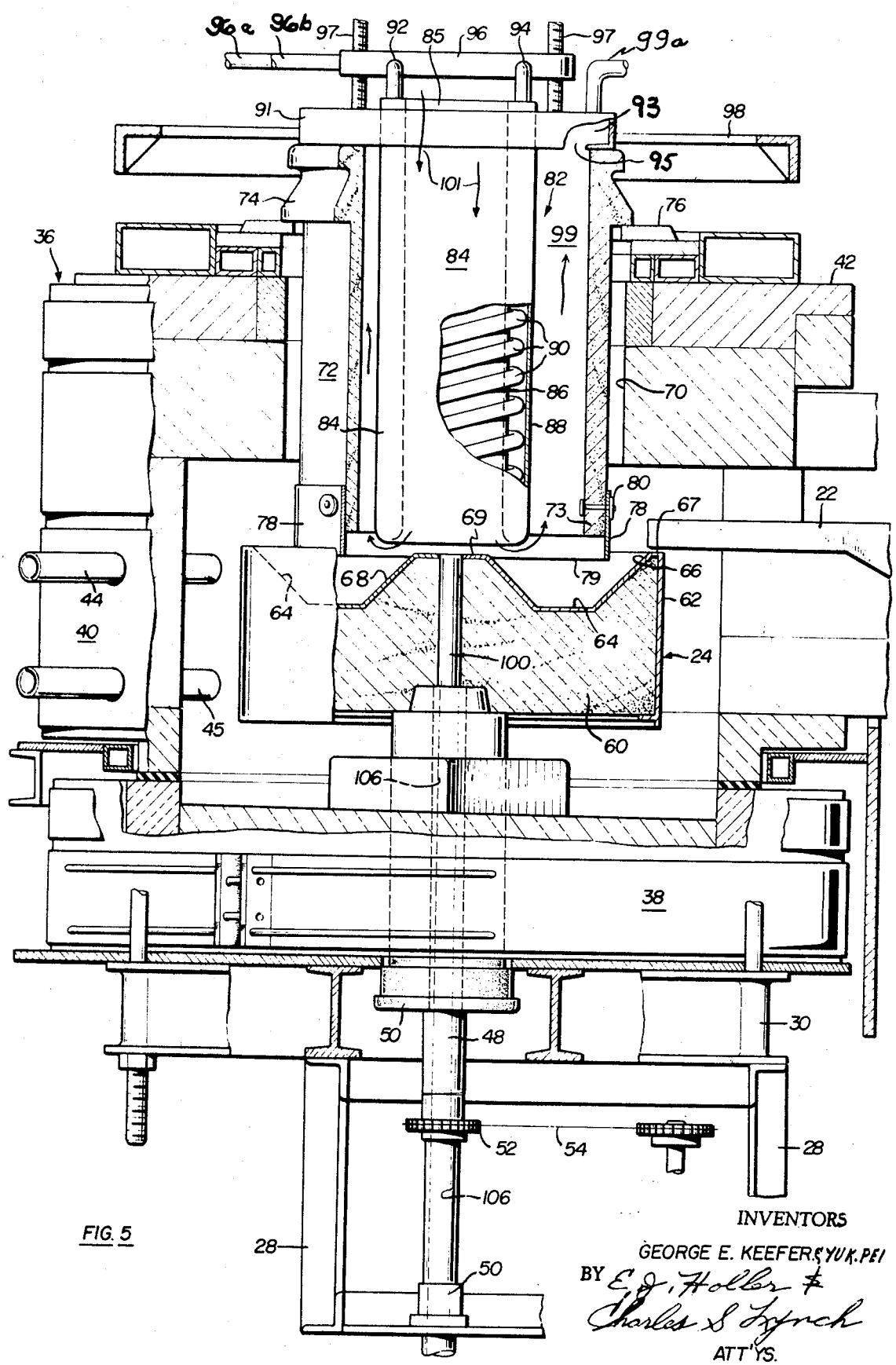

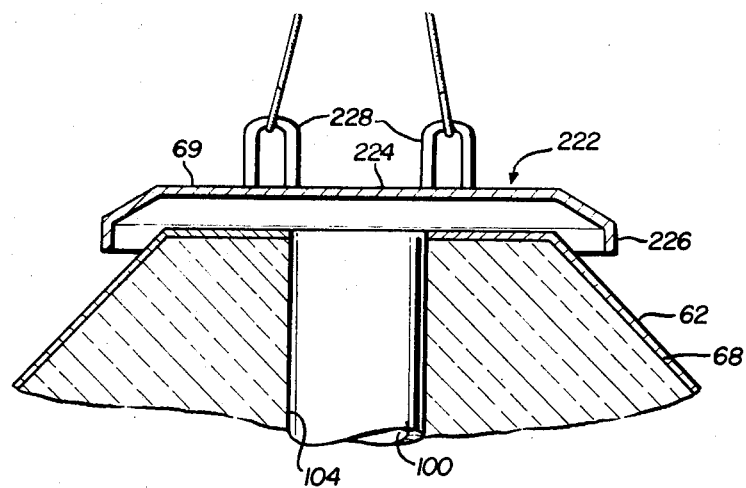
FIG. 5α
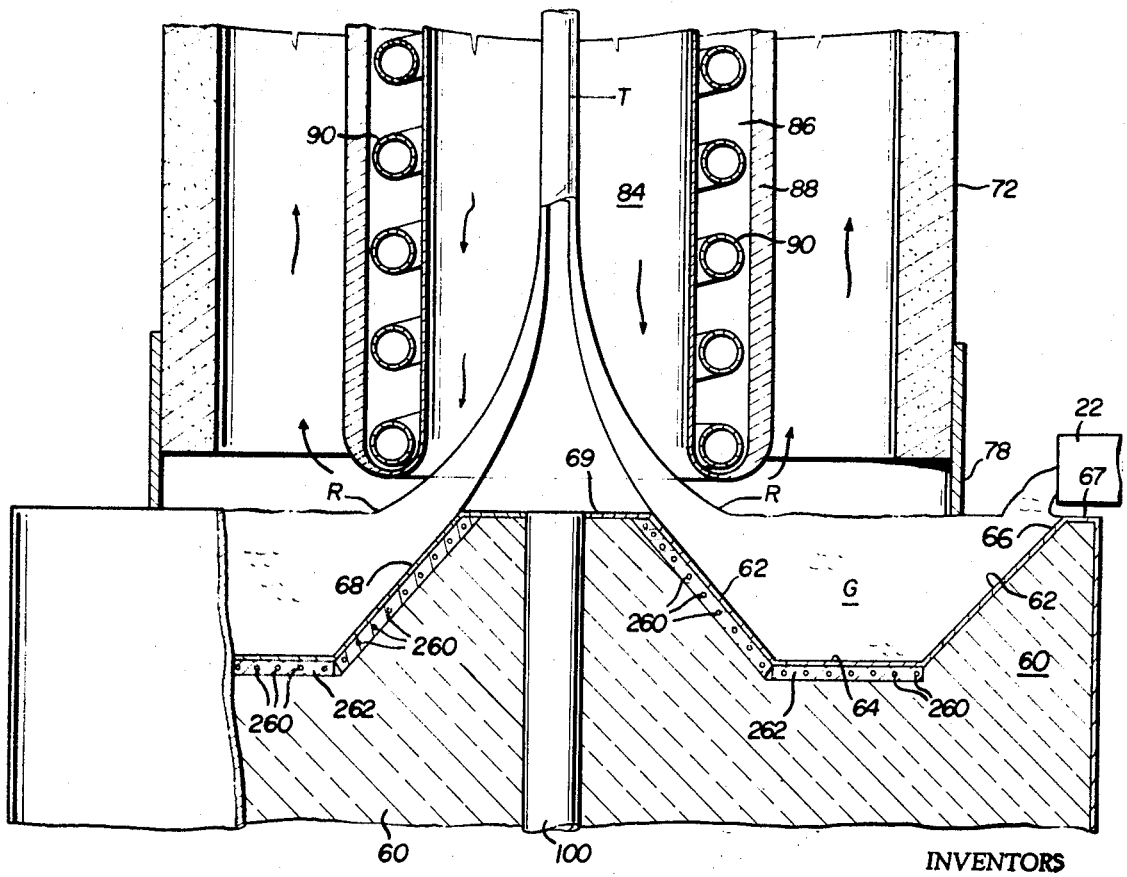
FIG. 8
INVENTORS
GEORGE E. KEEFER, YUK...
BY E. D. Holler &
Charles S. Lynch
ATT'YS.

GLASS TUBE FORMING APPARATUS AND METHOD

The process and apparatus of this invention provide tubing which is extremely accurately dimensioned and without divitrification. The following factors contribute to this result, (1) the drawing of the tube or rod from a shallow pan of glass so that the residence time of molten glass in the pan is minimized; (2) the extremely accurate control of the level of glass in the pan; (3) rotation of the pan past the point of glass introduction thereinto, so that all portions of the glass have the same thermal history; (4) concurrent and synchronized rotation of the draw rolls so as to prevent the imparting of any twist to the tube or rod being formed; (5) the effective maintenance of an exact temperature differential between the glass in the pan and the glass at the point of actual drawing of the tube or rod; and (6) the rapid, controlled and effective lowering of the temperature of the glass below the liquidus temperature at the point of tube or rod draw off from the pan.

BACKGROUND OF THE INVENTION

The present invention refers to an apparatus and method for drawing glass tubes and more particularly for drawing glass tubes of easily devitrifiable glass, e.g., glass which is later converted by heat treatment to glass-ceramic and such tubes may be utilized for piping in the chemical processing industry, etc., and are sold by the Assignee of the present invention under the trademark CERVIT.

Glass tubing, especially large diameter, heavy wall tubing of the type used for piping in the chemical process and food industry, is presently being produced by the updraw process. Molten glass from which the tube is to be drawn flows from a melting furnace into a stationary bowl which is fitted with a center bottom cone or lenser around which the tube is formed. A cylindrical water cooler is lowered into the bowl to be positioned centrally above the glass. Molten glass enters one side of the bowl, and burners controlled in quadrants occupy the other three sides. A cylindrical rotary refractory tube driven by a mechanism above the bowl extends downward into the glass between the burners and the water cooler. This rotary cylinder prevents direct flame impingement and radiation to the water cooler and to the glass at the point of tube initiation, and the cylinder also aids in stirring the glass to obtain a more or less uniform temperature. The refractory cylinder can be rotated in either direction and at various speeds to aid in producing tubing.

Although adjustments can be made regarding the pulling speed, burners, water cooler position and rotational refractory cylinder speed, this known process remains relatively slow and defects are quite common, including improper size, lack of concentricity, non-uniform wall thickness and both internal and external defects.

Such a process is incapable of producing glass tubing from readily devitrifiable glass composition. Reduced to its simplest form, the updraw process is dependent upon the temperature and rate of heat removal from the glass. Ideally, the glass should enter the bowl at a temperature just above the liquidus and be maintained at this temperature everywhere except as it moves into the root of the tube surrounding the central cone. In the present known updraw process, the heat gradient is actually upside-down through a large part of the process. Heat is applied to the top surface of the glass by burners around the bowl outside of the rotary tube and heat is lost from the bottom and sides of the bowl. Thus, with heat flowing from top to bottom, the top must be maintained at a temperature well above the liquidus in order to prevent the bottom from devitrifying. Sufficient heat must be applied at the top by the burners so that the glass, as it flows along the bottom of the bowl towards the cone, is never below the liquidus. The top surface of the glass inside the refractory rotary cylinder, however, must be quickly brought below the liquidus, by loss of heat to the water cooler and to air flowing in that area.

In the up-drawing of conventional glasses, the temperature of the entire pool from which the tube or rod is drawn is simply lowered to a temperature close to but above its log 1 viscosity temperature and sufficient heat is extracted at the moment of drawing to reduce the glass temperature to log 4. In readily devitrifiable glasses, devitrification occurs at the normal tube drawing viscosity — i.e., log 4 viscosity — and any attempt to maintain the pool from which the tube is drawn at or close to log 4 viscosity temperature results in devitrification of the glass in the pool before drawing can be accomplished. The problem of tube drawing from glass compositions having their liquidus temperature at substantially their log 4 temperature cannot be solved by following the known prior art processes.

The updraw glass mass initially has the shape of a "trumpet", the central opening of which is maintained by air blown through the nozzle. From a cooling ring having staggered downward openings, cooling air normally is blown continuously on the forming tube near the upper end of the trumpet shaped, glass drawing formation. In this manner, an attempt is made to control the wall thickness of the tubing. However, the nozzle and the cooling ring both require exact air adjustments to maintain any dimensional control. The cooled and solidified glass tubing is continuously drawn upward by a pair of rollers disposed above the stationary refractory bowl.

Conventionally, the upward draw process is started by lowering a circular bait downwardly onto the upper surface of the draw cone, permitting the bait to adhere to the molten glass and then slowly withdrawing the bait together with a crudely formed tube attached thereto. This crudely formed glass tube is then inserted between opposing upward pulling rollers which maintain a uniform but adjustable pulling rate.

In any tube or rod updraw apparatus, the glass tube being drawn is then ultimately brought to size and shape, and an attempted equilibrium is established correlating the updraw rate with the temperature and flow conditions of the system. The glass tube size, wall thickness and dimensional tolerances are all subject to equilibrium upsetting conditions, such as variations in the pulling rate of the upward draw rollers, temperature of the incoming glass, the level and temperature of the glass in the pan, the air temperature and rate of air flow through the center of the cone, the temperature and heat intensity of the surrounding burners, and the elevation and position of the cooler relative to the glass drawcone and the refractory heat shield. The production rate and quality of glass tubes produced by this process is, however, primarily dependent upon the skill of the operator. A variation in any one of the process variables above set forth can considerably affect the drawn glass tube or glass rod dimensions and quality.

SUMMARY OF THE INVENTION

From the foregoing, it will be evident that substantial difficulties have been encountered in the manufacture of glass tubing of uniform dimensions by the utilization of known updraw tube forming methods and apparatus. Further, the known methods and apparatus are incapable of forming glass tubes and rods from glass compositions which are readily devitrifiable. The present invention provides a method and apparatus which is capable of producing better quality tubing and rod from any glass composition, and which is particularly adapted for the formation of tubes and rods from glass compositions which are readily devitrifiable. While the present invention proposes the modification of existing updraw apparatus in several individual aspects, the result is a unified apparatus for and method of producing drawn glass products under improved thermal conditions which guarantee substantial and corresponding improvements in dimensional control and even in operability, e.g., in the case of readily devitrifiable glass compositions.

For the readily devitrifiable glasses which have a very short temperature working range, it has been found desirable to actually reverse the direction of heat flow in the glass confining vessel, from that of conventional updraw processes. This is accomplished by providing side and bottom heat sources for the rotary pan assembly so that heat flows toward the glass in all directions except on the top surface where heat is removed by the water cooler and by convection air at the root of the tube surrounding the central cone.

The problems inherent in drawing tubing from a glass composition having co-incident log 4 viscosity temperature and devitrification temperature are solved herein by retaining a limited volume of molten glass at an average temperature above the liquidus, locally reducing the temperature of a portion of this volume to a temperature no greater than the liquidus and drawing a tube upwardly from the locally cooled molten glass at a rate sufficient to prevent devitrification, even though the glass would devitrify at the drawing temperature if in a stagnant or non-dynamic state.

One striking feature of the present invention is the provision of a pool of molten glass which is (1) of limited volume, (2) of uniform thermal history and (3) of constant level. This limited volume of glass insures movement of the glass into the tube-forming zone at a controlled substantially uniform rate and without any extended residence time which would promote devitrification. The uniform thermal history of the glass means that there are no hot and cold spots in the pool of glass from which the tube is formed, there are no appreciable thermal currents causing irregular flow to the tube-forming region and, none of the glass can initiate devitrification by virtue of its being cooled prematurely. By control of the glass level with extreme accuracy insures the smooth flow of the glass to the tube-forming area and further maintains a constant level or "head" of glass at the tube-forming cone, thus eliminating surges which normally cause variations in wall thickness in the tube being drawn.

To obtain these advantages, the shallow pool of glass is formed in a metallic pan or cup of platinum or the like which is supported upon and backed up by a refractory block forming a rotatable base for the pan. The pan is rotated past a source of glass, such as the forehearth of a glass making furnace, from which a more or less constant stream of glass issues. By allowing the molten glass to spill over the edge defined by the outer periphery of the pan, the glass level in the pan can readily be maintained at a constant value. Of course, other level maintaining means or apparatus can be used. The pan, being metallic, is heated by combustion burners preferably playing tangentially directly upon the pan. By providing the pan with a skirt which is elongated axially of the axis of rotation of the pan, the pan itself is heated directly and the conductivity of the pan itself aids in heating the pool of glass in the pan from the under surface thereof. Alternatively, the pan can be immersed in the flames of upper and lower sets of burners to uniformly heat the molten glass in the pan. The refractory block acts as a heat sink and serves to even out any temperature variations in the pan and in the glass.

The glass tube is drawn from the cone of the pan upwardly through a chilling sleeve, and a fixed flame shield surrounds the chiller to protect the chiller and the trumpet at the point of tube drawing from the flames which encompass the pan and the glass entering the pan. One preferred aspect in the drawing of products from readily devitrifiable glass compositions is the provision of a thin, metallic, glass-contacting edge on the flame shield to provide a non-chilling seal. The combination of the flame shield and the chiller, together with the rapid flow of glass through the shallow pan, makes possible the operation of the process within the narrow temperature limits required by the short working range of the readily devitrifiable glasses, and insures the chilling of the glass to a temperature below its liquidus temperature at the time of tube formation, thus lessening the dangers of devitrification.

Since the pan is rotating, the trumpet formed at the cone of the pan also rotates and the tube, as it progressively solidifies above the trumpet will also rotate. The pull rolls which are located above the pan and in alignment with the axis of rotation of the pan are also rotated in synchronism with the pan so that there is no spiral flow or "twist" imparted to the formed tube. In this way, mechanical strains are avoided in the formed tube and any irregularities which might occur because of thermal inconsistencies in the partially formed tube which would yield under any rotative load are eliminated. Thus, mechanical and thermal consistency and uniformity are promoted by co-rotating the pan and the pull rolls.

While the advantages of thermal uniformity and dimensional stability can be obtained by the practice of this invention in the drawing of tubes or rods from glasses of any desired composition, the greatest advantage of the present invention is obtained in the forming of drawn products from readily devitrifiable glass compositions. Here, the following of the method of the present invention and utilizing the apparatus of the present invention are crucial for operability, since devitrification can be avoided.

It is, therefore, an important object of the present invention to provide a process for the manufacture of drawn products from glass by drawing the product from a shallow pool of molten glass having uniform thermal characteristics and of constant level.

Another important object of the present invention is the provision of an improved apparatus for drawn glass products wherein the product is drawn from a rotating pan of molten glass by a pair of upper draw rolls which are rotatable in synchronism with the pan.

It is a further object of this invention to provide an improved process for the manufacture of tubing or the like from glass compositions which are readily devitrifiable and wherein the tubing is drawn from a molten pool of glass disposed in a pan rotatable about a vertical axis and wherein the pan is immersed in a combustion flame, the pool of glass is shielded from the flame during drawing by a non-chilling shield, and the glass in the pool is retained above its devitrification temperature by the flame-immersed pan until the forming operation is initiated.

Yet another, and no less important, object of the present invention is the provision of an apparatus for drawing glass tubing or the like and including a relatively shallow pan rotatable about a vertical axis, means for introducing molten glass into the pan adjacent the periphery thereof with excess glass flowing radially outwardly over the edge of the pan, and a plurality of draw rolls positioned above the pan for drawing tubing therefrom, the rolls being disposed about the axis of rotation of the pan and being co-rotatable therewith about said pan axis.

More particular important objects and advantages of the present invention will become apparent by reference to the following detailed description in connection with the attached drawings.

BRIEF DESCRIPTION OF THE DRAWINGS

FIG. 2 is a front view of the installation of FIG. 1 as seen along line 2—2 showing the drawing roller installation above the rotating pan assembly.

FIG. 4 is an enlarged side view of the roller rotating mechanism with parts broken away and partly shown in cross-section for clarity.

FIG. 5 is an enlarged cross-section in vertical direction through the forebay arrangement of the present improved glass drawing installation illustrating the rotating pan and heating and cooling arrangement more in detail.

FIG. 5a is an enlarged partial cross-section through the "throat" or "nose" portion of the center cone showing the bait in place for initial draw-off of the tube.

FIG. 8 is an enlarged cross-section through the rotating cup, center cone and lower end of heat barrier and water cooler more distinctly illustrating an alternate process of heating, cooling and drawing of the tube.

DESCRIPTION OF THE PREFERRED EMBODIMENT

Figure 1:
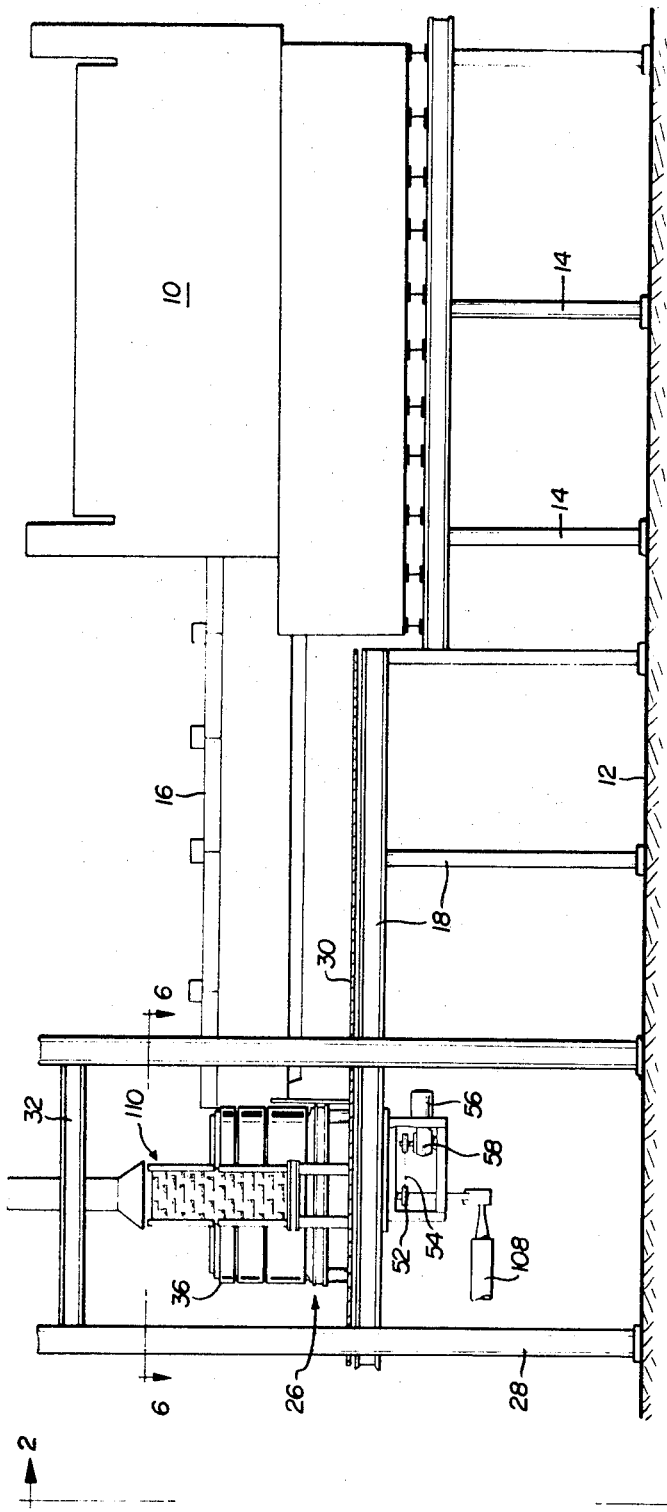
FIG. 1 is a side elevation view of the present updraw process installation.

With reference now to FIG. 1, there is illustrated schematically a glass melting furnace indicated at 10 supported on the ground floor 12 by means of a frame 14.

Attached to the furnace 10 at the delivery end thereof is a conventional forehearth and refining assembly 16 likewise supported on the ground floor 12 by means of a frame 18. The forehearth assembly 16 has a glass feeding channel 20, more clearly seen in FIG. 6, which is adapted to feed molten glass through a conduit 22 into the rotating pan assembly 24 of the updraw forebay assembly 26. The updraw forebay assembly 26 is likewise supported on the ground floor 12 within a framework 28 supported upon a platform.

With further reference to FIG. 2, the frame work 28 is adapted to support another platform 32 above the forebay assembly 26. The upper platform 32 supports the updraw roller mechanism 34 which is adapted to draw the formed glass tubes upwardly from the forebay assembly 26.

The updraw forebay assembly 26 will first be described in detail.

With particular reference to FIG. 5, the forebay updraw assembly 26 includes pan heating furnace assembly 36 of substantially cylindrical configuration having a composite bottom wall 38, composite side wall 40 and a composite top portion 42. These composite wall portions of the furnace assembly 36, as shown in FIG. 5, are made up of various members produced from refractory and insulating material as is common practice and which does not need to be described further. Near the bottom wall portion 38 of the furnace assembly 36, a plurality of spaced heating burners are arranged to heat the underside of the pan assembly 24, one such burner is shown at 45 and which may be gas heaters or the like. In a similar manner burners 44 heat the upper portion of the pan assembly. The burners are adapted to heat the inside of the furnace assembly 36, to a temperature of about 2,900°F. The burners 44 are positioned such that the combustion products thereof exit in a tangential direction.

Disposed within the furnace assembly 36, at the center thereof, is a rotating pan assembly 24 supported on a vertical center shaft 48 which extends downwardly through the bottom wall portion 38 of the furnace assembly 36 and which is suitably supported within bearings 50 on the frame work 28 and platform 30 respectively.

Immediately below the platform 30, the shaft 48 is provided with a sprocket 52, suitably secured thereto, which is adapted to be engaged by a drive chain 54. With reference back to FIG. 1, the drive chain 54 is adapted to be driven by means of a motor 56 through a suitable gear speed reducer mechanism 58 in order to rotate the cup assembly 24 at a relatively slow speed of about 1 to 10 rpm.

The pan assembly 24, generally is a cylindrical body of refractory material, such as for instance known under the trade name "MONOFRAX H", or the like. The refractory material 60 of the rotating cup assembly 24 is encased at its peripheral walls and top surface with a sheet of platinum or other heat-resistant and erosion-resistant material 62. The combined mass of the refractory 60 and the metallic covering 62 serves as a heat sink to uniformly distribute the heat of combustion to the pool of molten glass in pan 64.

Figure 6:
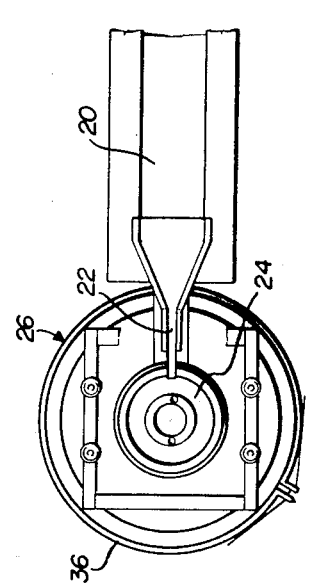
FIG. 6 is a cut-away top view of the glass feeding arrangement into the pan of FIG. 5 as seen along line 6—6 in FIG. 1.

The upper surface of the pan assembly 24 is axially recessed so as to provide a relatively shallow pan 64 having a circumferential outer rim 66 and a central cone portion 68. The rotating cup assembly 24 provides a container for receiving molten glass from the conduit 22 which is connected to the melting furnace 10 as seen in FIGS. 1 and 6. The molten glass enters the pan 64 of the rotating assembly 24 through the refractory wall of the forebay furnace assembly 36 at a temperature of about 2,750°F.

As seen in FIG. 5, the platinum shield 62 provided around the refractory material 60 of the pan assembly 24 completely covers the inclined sides of the rim portion 66 and cone portion 68 as well as the horizontal top surface of the pan 64.

The composite top wall portion 42 of the updraw forebay furnace assembly 36 is provided with a large central aperture 70 through which a cylindrical member 72 of refractory material extends downwardly towards the pan assembly 24. The cylindrical member 72 is fixedly supported on a rim or plate member 76 disposed on top of the composite top portion 42 of the furnace assembly 36. The lower end of the cylindrical member 72 terminates above the top of the rotating cup assembly 24 and a heat barrier shield or baffle 78 preferably made of platinum, or a comparable material, is secured to the lower end 73 of the cylindrical member 72 by means of fasteners 80. The platinum heat shield or barrier 78 extends beyond the lower end 73 of the cylindrical member 72 and into the pan 64 of the rotating cup assembly 24 to terminate just below the upper edge 67 of the outer rim 66 of the pan assembly 24.

When the pan 64 is filled with molten glass introduced thereinto through the forehearth channel and conduit 22, the level of glass in the pan is determined by the level of the edge 67 at the outer periphery of the pan. This level is slightly above the level of the top face 69 of the draw cone 68, so that there is a molten glass "head" tending to flow the molten material from the periphery of the pan to the center of the pan. The level of the lower extremity 79 of the shield 78 is below the level of both the pan outer periphery 67 and the pan center portion 69 so that the lip 79 is immersed in the body of molten glass.

Centrally located within the cylindrical member 72 and axially aligned therein, is a water cooler assembly 82 comprising a cylindrical housing 84 formed by an inner peripheral wall 86 and an outer peripheral wall 88 of metallic material, preferably stainless steel. Interposed between walls 86 and 88 of the cylindrical housing 84 is a double helical coil 90 extending from the top to the bottom of the housing 84 and back to the top of housing 84. The tubular inner coil 90 is connected to an inlet pipe 92 and to an oppositely disposed outlet pipe 94. The inlet and outlet pipes 96a and 96b are connected to an upper plate support 96 for extension therethrough, and the inlet pipe 96a is connected to a source of cooling water (not shown). Pipe 92 communicates with inlet pipe 96a and helical coil 90, and pipe 94 communicates with pipe 96b and the opposite end of double helical coil 90. Thus, during operation of the apparatus, cooling water is continuously circulated through the tubular coil 90 of the water cooler assembly 82.

The outer ends of the plate support 96 are retained on oppositely disposed pairs of threaded rods 97 attached to a cap member 98 above the pan heating furnace assembly 36 and overlying the cylindrical shield 72. On rotation of the threaded rods 97, the water cooler assembly 82 can be vertically adjusted within the cylindrical member 72 to move the cylindrical housing 84 towards or away from the draw cone 68 of the pan assembly 24. The cylindrical housing 84 of the water cooler assembly 82 is axially and vertically aligned with the vertical center axis of the draw cone 68 and, in the working condition of the apparatus, the cylindrical housing 84 is lowered through the cylindrical member 72 to lie slightly above the upper face 69 of the cone 68.

The assembly 82 projects through a cover cap 91 overlying the member 72, the cap 91 being annular to receive the upper end 85 of the housing 84. The cap 91 has an inner plenum chamber 93 opening through apertures 95 onto the annular space 99 between the housing 84 and the member 72. This chamber 99 is exhausted, as through an exhaust conduit 99a connected to an exhaust fan (not shown) to increase the flow of air over the cone 68, as indicated by directional arrows 101.

The rotating pan assembly 24 is provided with a central bore 100 which extends upwardly to open onto the draw cone 68 at the horizontal top 69. The central bore 100 in the pan assembly 24 is connected to a tube 106 which is disposed within the rotating pan supporting shaft 48 for extension downwardly through the shaft and outwardly thereof for connection to an air inlet 108 (see FIG. 1) which is suitably connected to a source of air under pressure or a source of vacuum (not shown).

Thus, in operation, high pressure cooling air, if desired, can be forcefully introduced from the inlet conduit 108 into the tube 106 for flow upwardly through the pan assembly for exit in an upward direction and inside of the glass tube being formed around the draw cone 68. The controlled forced cooling air thus provided, aids in removing heat from the internal surfaces of the glass tube being formed and also may serve to radially enlarge the tube. Alternatively, the conduit 106 may merely be open to the atmosphere, or closed or attached to a source of vacuum. When conduit 106 is open, the heat of tube formation at the nose 69 will induce an up-draft of cooling air through the tube being formed. When conduit 106 is connected to a source of vacuum the flow of air will be downward, and the vacuum tends to reduce the tubing size. Also, the air becomes heated before reaching the periphery of cone top 69. With some glasses this is an important factor, since cooling of the glass in this area with upwardly flowing air can induce devitrification of the glass at the periphery of cone top 69.

As shown in FIG. 1, combustion gases from the pan heating chamber of the forebay furnace assembly 36 are continuously drawn off through a chimney and stack assembly 110.

Figure 3:
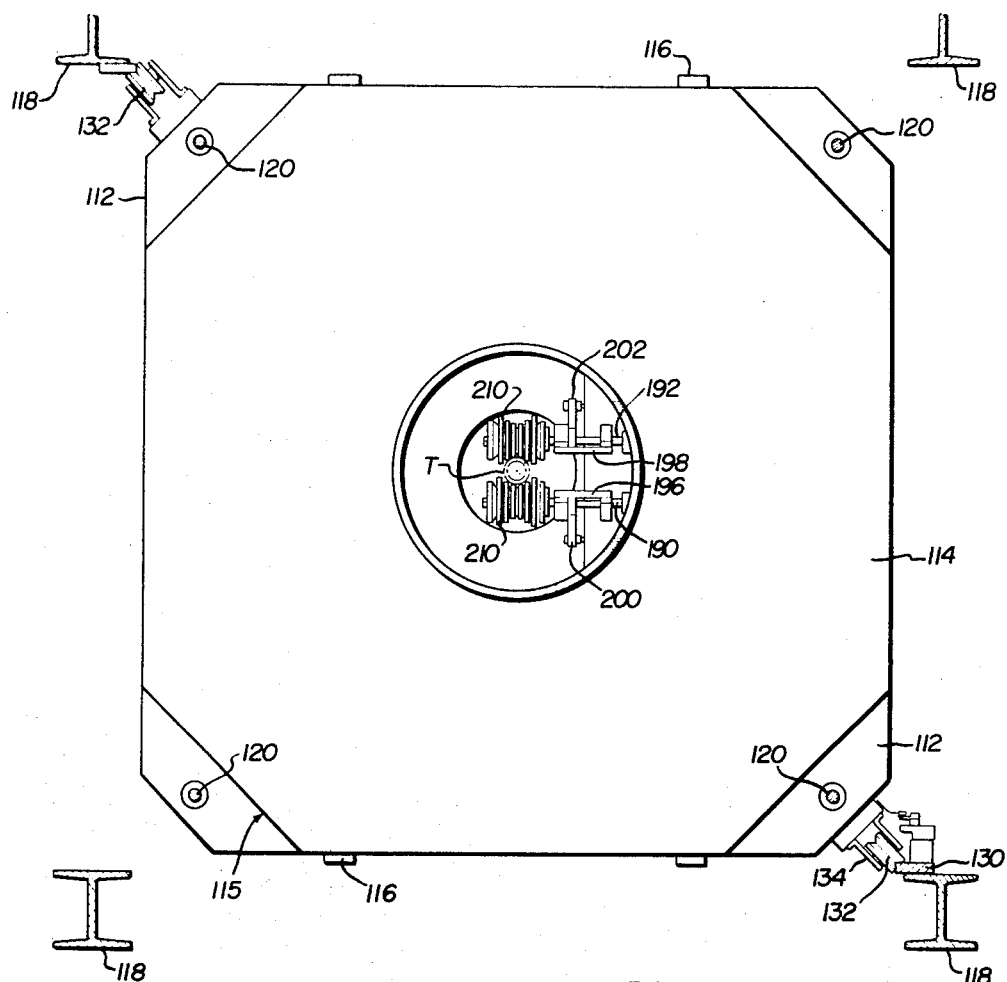
FIG. 3 is a transverse cross-section through the installation of the upper part shown in FIG. 2 and as seen along line 3—3 of FIG. 2.

With particular reference to FIGS. 2 to 4, the updraw assembly 34 comprises two vertically spaced platforms or frames 112 and 114, respectively, which are connected together by vertical strut members 116. The platforms 112, 114 are substantially square shaped, as seen in FIG. 3, and are disposed edgewise between four upright columns 118 extending from the platform 32.

The lower main supporting platform or frame 112 is supported on the four corners on threaded rods 120 which extend upwardly alongside the uprights 118 and past the recessed corners 115 of the upper platform 114 to a fixed upper deck 122 disposed on top of the uprights 118. The lower ends of the threaded rods 120 are supported within pads 124 which are secured to the platform 32 and which are equipped with suitable bearings (not shown) to permit rotation of the rods 120 therein. The upper deck 122 supports a driving mechanism 126 driven by a motor 128 to simultaneously rotate all four of the threaded rods 120.

With reference to FIG. 3, at least two diagonally disposed upright columns 118 are provided with longitudinal guides 130 adapted to be engaged by rollers 132 secured to diagonally disposed opposite corners of the lower platform 112 secured thereto by means of brackets 134. This arrangement stabilizes the assembly laterally during elevation and lowering of the updraw assembly 34 along the threaded rods 120 and maintains the platforms 112 and 114 in central horizontal parallel alignment between the upright columns 118, so that no bending stresses are imposed on the threaded rods 120.

By this arrangement, the updraw assembly 34 can be raised or lowered along the uprights 118 relative to the forebay assembly 26 upon rotation of the threaded rods 120. In FIGS. 2 and 4, the updraw assembly 34 is shown in an operating position.

As illustrated more in detail in FIG. 4, the lower platform or frame 112 of the updraw assembly 34 rotatably supports a depending collector ring assembly 136 of tubular configuration. The upwardly drawn tube extends axially through the assembly 136 as the tube is drawn upwardly from the rotating pan 24 in the forebay furnace 36.

The updraw collector ring assembly 136 — which will be described later in detail — is supported for rotation on a stationary annular plate 138 fixedly supported by platform 112.

Figure 3A:
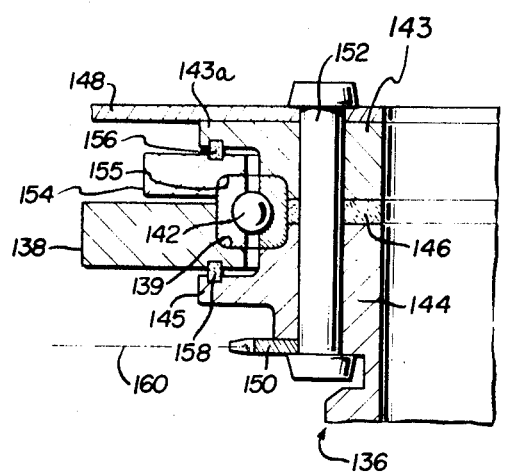
FIG. 3a is an enlarged cross-section through the roller drive support bearing and slip ring assembly of the draw roller assembly as seen in FIG. 4.

With particular reference to FIG. 3a, the collector ring assembly 136 is suspended from the stationary plate 138 and is supported therein for rotation by means of an antifriction bearing 142. The outer race of the antifriction bearing 142 is retained in a radial recess 139 of the stationary plate 138, and the inner race of the antifriction bearing 142 is supported within oppositely disposed radial recesses of a pair of upper and lower bearing clamp rings 143 and 144, respectively. The opposite adjacent inner surfaces of the opposing bearing clamp rings 143 and 144 are separated by an insulating spacer ring 146.

Supported on the upper bearing clamp ring 143 is the rotating platform 148 adapted for rotation with the collector ring assembly 136. Immediately adjacent and below the lower bearing clamp ring 144, is disposed a sprocket wheel 150 as shown in FIG. 4. The bearing clamp rings 143 and 144, rotating platform 148 and the sprocket wheel 150 are securely clamped together against the inner race of the bearing 142 by means of a plurality of conduit nipple assemblies 152 (only one of which is shown in FIG. 3a) which are spaced around the bearing clamp rings 143 and 144 which form the upper, supporting portion of the collector ring assembly 136.

The stationary plate 138 retains only the lower portion of the outer race of the antifriction bearing 142, to provide space for the insertion of a bearing retainer 154, which retains the upper portion of the outer race of the bearing 142 within a radial recess 155. The retainer 154 is disposed above and adjacent the support plate 138.

The opposite upper and lower bearing clamp rings 143 and 144 are each provided with radially outwardly extending flanges 143a and 145, respectively, which extend outwardly beyond the external diameter of the antifriction bearing 142.

The radially outwardly extending flanges 143a, 145 of the respective bearing clamp rings 143 and 144, are adapted to sealingly abut against sealing members 156 and 158, respectively, disposed within suitable grooves in the stationary plate 138 and retainer 154, respectively. The upper flange 143a of the upper clamp ring 143 is disposed adjacent and in overlapping relationship on top of the retainer 154 spaced therefrom by the sealing member 156 adapted to seal the space between the adjoining surfaces of the flange 143a and retainer 154. Likewise, the lower flange 145 of the lower bearing clamp ring 144 is disposed in overlapping adjacent relationship underneath the stationary support plate 138 spaced therefrom by the sealing member 158 which is adapted to seal the space between the adjoining interfaces of the flange 145 and support plate 138.

In order to rotate the upper collector ring assembly 136 and turn table 148, a drive chain 160, trained around the sprocket 150, is drivingly connected to a drive sprocket 162 driven by a motor 164 and suitable speed reducer 166 supported on top of the platform 112.

As shown in FIG. 4, the turn table 148 carries a draw roller driving mechanism generally indicated at 168, positioned between the lower platform 112 and upper platform 114.

A support structure 170 supports the draw roller driving mechanism 168 on an upright plate 172 welded or otherwise secured to the turn table 148. The upright plate 172 supports a horizontal support plate 174 having a rearwardly disposed upwardly extending flange 176.

The rear upstanding flange 176 is adapted to support a speed reducer 180 adapted to be driven by a motor 182. The speed reducer 180 has an output shaft 184 rotatably supported in a bearing assembly 186, which is secured to the brace member 178. The output shaft 184 carries a gear 188 which is adapted to be in constant mesh with a similar gear (not shown) disposed adjacent thereof in the same vertical plane. The reducer output shaft 184 is connected to a roller drive shaft 190. A similar roller drive shaft 192 (see FIG. 3) is disposed adjacent and in spaced relationship and in horizontal parallel alignment with the roller drive shaft 190 and is adapted to be driven by a gear similar to gear 188, which is in mesh therewith. Thus, upon rotation of the reducer output shaft 184, the roller drive shaft 190 will be rotated in one direction as the gear 188 rotates the opposite roller drive shaft 192 in the opposite direction.

With additional reference to FIGS. 3 and 4, the forward ends of both roller drive shafts 190 and 192 are supported for rotation in spaced bearing blocks 194 which are suitably fastened to oppositely disposed vertical plate members 196 and 198, respectively. Each of the oppositely disposed bearing support plate members 196 and 198 are attached to the upper ends of downwardly extending pivotal arm members 200 and 202, respectively, as most clearly seen in FIG. 4. Each of the lower ends of the pivot arms 200 and 202 is supported on a pivot shaft 204 each of which is journaled for rotation within a bearing block 206 suitably fastened to the underside of the horizontal support plate 174.

The drive shafts 190 and 192, intermediate the ends, are each provided with a double universal joint assembly 208 to permit flexible repositioning of the drive shafts 190 and 192 relative to each other and for angular and universal drive connection relative to the bearing support plates 196 and 198 which are disposed on a higher level than the reducer output shaft 184.

Thus, by the arrangement of the pivot support arms 200 and 202, the oppositely disposed parallel drive shafts 190 and 192 by the provision of the universal joints 208 can be moved relative to each other in a horizontal plane to thereby increase or decrease the spacing between them for a purpose to be explained hereafter.

Outwardly of the vertical bearing support plates 196 and 198, respectively, each of the roller drive shafts 190 and 192 is provided with a draw roll assembly 210, both of which are identical so that the description of one will similarly apply to the other.

As indicated in FIGS. 3 and 4, the opposite disposed draw rolls 210 are located adjacent the vertical center line "X" of the apparatus along which the glass tube, indicated at "T", will be drawn upwardly from the forebay assembly 26.

The draw roll assembly 210 is composed of a hub (not shown) which is keyed or otherwise secured to the drive shaft 190, and which has a flange 212 at the rear end. The hub (not shown) is adapted to mount a series of alternate plates 214a, b, preferably of a somewhat soft, heat resistant material and which, in opposite direction, decrease in diameter towards the center of the roll assembly.

The plates 214 alternate in diameter from both ends of the roll, so that large diameter plates 214 are disposed at opposite ends of the roll, next adjacent are two medium size diameter plates 214a and, finally two small size diameter plates 214b disposed adjacent each other at the center of the roll assembly 210. Both roll assemblies 210 are disposed such that the center line X of the glass tubing T is centered between the two adjacent inner, small diameter plates 214b. The plates 214a, b, are separated by suitable spacers 216 and the assembly is clamped together on the shaft 190 by means of a rotatable clamping collar 218 which is threaded on the hub (not shown). Each draw roll assembly 210 is axially retained on the shaft end of shaft 190 by means of a lock nut 220. Thus, by the provision of outwardly and inwardly staggered plates of different diameters, of which each of the draw roll assemblies 210 is made up, a variety of tubing diameters can be accommodated for extension between and gripping engagement with the draw rolls 210.

As most clearly seen in FIG. 3, the distance between the draw roll assemblies 210 can be varied by means of the provision of the pivot arms 200 and 202 thereby increasing or decreasing the frictional engagement force of the draw roll assemblies 210 with the tubing T for variation in wall thickness and overall diameter of the tubing T, which is continuously formed and drawn through the collector ring assembly 136. The pivot arms may be actuated by fluid power such as hydraulic cylinders (not shown) which are automatically controlled as described hereafter.

At one point along the drawn glass tube T, above the updraw assembly 34, the drawn tube or rod will be cut off at predetermined intervals, which can be done by any known conventional manual or mechanical cut off means.

Figure 7:
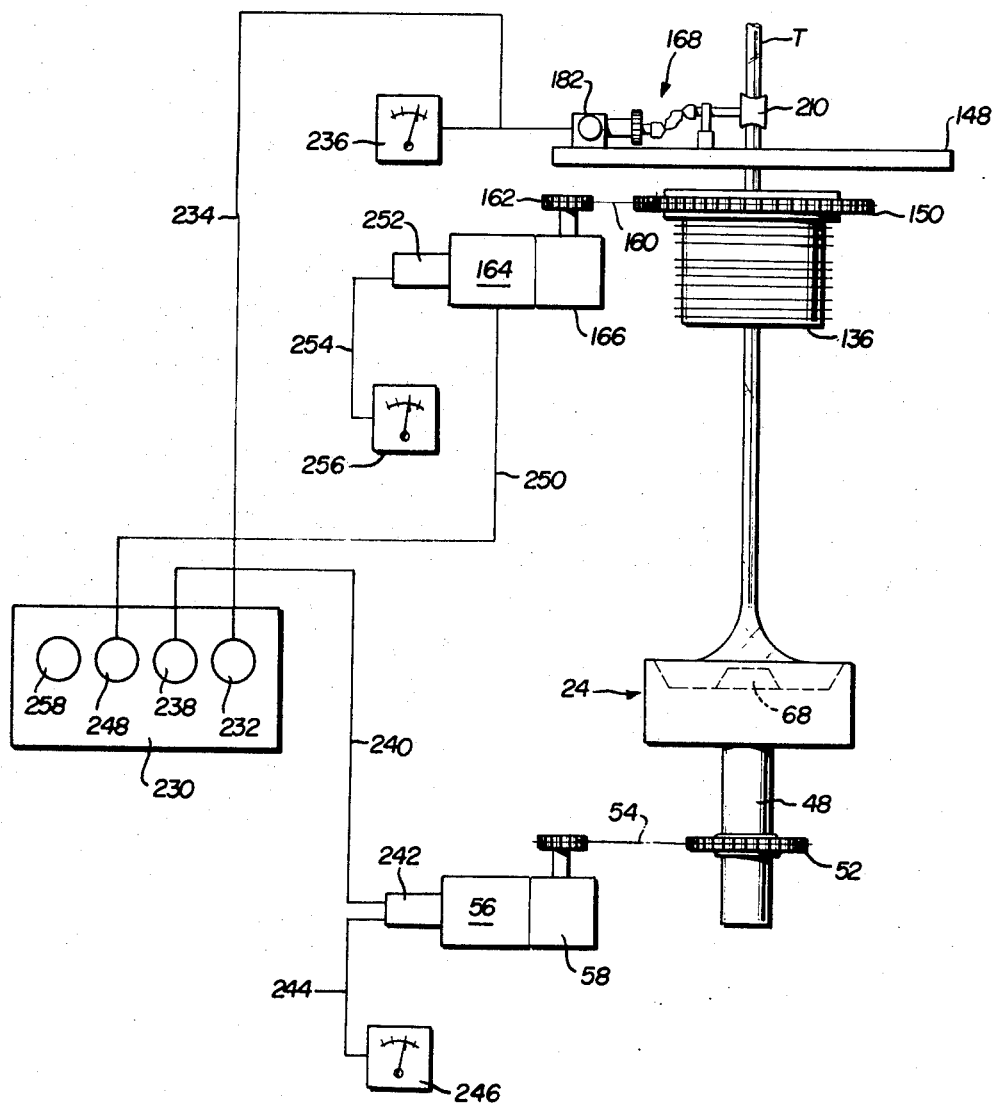
FIG. 7 is a schematic illustration of the electric drive control system which inter-relates rotation of the pan rotating platform and updraw rollers.

With particular reference now to FIG. 7, which schematically shows the electrical drive control for the rotating pan assembly, rotating turn table and for rotation of the updraw rollers, it will be seen that all the motors 56, 164 and 182 are controlled from a single control panel 230. The control panel 230 has a first control button 232, which controls operation of the motor 182 by being connected thereto by a conduit 234. The motor 182 operates the draw roller drive mechanism 168 and is further connected to a tachometer 236.

A further control button 238 is electrically connected by means of a conduit 240 to the motor 56 which controls operation of the rotating pan assembly 24. The motor 56 is likewise connected by means of a tachometer generator 242 and conduit 244 to a tachometer 246.

Still another control button 248 is electrically connected to the motor 164 by means of a conduit 250. The motor 164 operates the chain drive 160, 162 for rotation of the collector ring assembly 136 and turntable 148 and this motor is likewise additionally connected by means of a tachometer generator 252 and conduit 254 to a tachometer 256.

A dual purpose control button 258 is provided on the control panel 230, which is adapted to selectively couple the drives for the rotating pan assembly 24 and for the rotation of the updraw rollers 210 together, and also controls the synchronization of the rotation of the rotating pan assembly relative to the draw rollers.

The read-out of all of the tachometers 236, 256 and 246 are located within the control panel 230 for correlation within the single control unit 230.

Thus, the correlated electrical control of the rotating sub-assemblies of the updraw apparatus of the present invention, provides means for speed control of the updraw rollers by simultaneously actuating the drive mechanism for the updraw rollers for rotation around the axes of the glass tube being formed and pulled through the updraw rollers and, furthermore, provides means to control the updraw roller pressure during rotation of the rollers.

In addition, the unitary electric control provides an ability to control both, the updraw roller unit and the rotating pan assembly, simultaneously, with one control.

The motors are reversible motors so as to rotate the turntable supporting the updraw roller assembly and the rotating pan assembly in either clockwise or counter-clockwise direction, as may be required.

Furthermore, the unitary control provides the ability to run or rotate either of the rotating sub-assemblies without rotating the other.

The rotational speed between the rotatable sub-assemblies can be varied as required, i.e., one rotating sub-assembly may be rotated at a speed different from the speed of rotation of the other rotating sub-assembly. Conversely, all of the rotatable sub-assemblies can be rotatably driven at synchronized speeds. When the speeds are synchronized, rifling and twisting of the pipe resulting from rotation of the rotating pan assembly, will be effectively prevented.

To start the updraw process, the apparatus shown in FIG. 5a is utilized. A starting cap or "bait" 222 is placed on top of the face portion 69 of the center cone 68 of the rotating pan assembly 24. The bait 222 is a flat, inverted saucer-type member 224 which overlies the face portion 69 of the center cone and which is provided with a depending cylindrical rim portion 226 which encircles the face 69. The bait 222 is provided at the top with hooks 228 for lowering onto the center cone 68 and, conversely for raising from the center cone 68 through the cylindrical water cooler 84 by means of a lift assembly (not shown) disposed on the upper platform 114. Molten glass entering the annular space between the bait 222 and the surface 69 becomes entrapped therein and adheres to the rim portion 226. Lifting of the bait 222 thus starts the draw process.

With particular reference to FIG. 8 (in conjunction with FIG. 5), this figure shows the rotating pan assembly and the lower portion of the water cooler and heat barrier in enlarged fragmentary cross-section, to more clearly illustrate the present improved glass tube drawing process of this invention.

The burners 44 (FIG. 5), which preferably are combustion elements, heat the furnace chamber in which the rotary pan assembly 24 is disposed, to a temperature of about 2,900°F., as for instance in a particular example using a particular glass composition. The heat exiting from the burners 44 is placed tangentially against the metallic exterior wall of the rotating pan assembly 24 to maintain the platinum clad bottom of the pan 64 well above the temperature of the liquidus of the particular glass composition exemplified herein. The entire rotating pan assembly 24 is immersed in the flames of the combustion burners, so that the complete refractory-metal assembly conducts heat to the pool of glass in the pan.

For explanation, the term liquidus is the maximum temperature at which equilibrium exists between the molten glass and its primary crystalline phase.

Conversely, as indicated in FIG. 8, it may be found desirable for certain glass compositions to employ direct internal surface heating of the pan 64 and the cone 68, which, for instance, as indicated in FIG. 8, may comprise a series of electrical resistance heating elements 260 positioned underneath the platinum-clad bottom surface of the pan 64 and of the cone 68, the elements being disposed within an appropriate layer of insulating material 262. The electrical resistance heating elements 260 are suitably connected to a source of electrical energy (not shown) to thereby continuously and effectively heat the bottom of the pan 64 and the outer surface of the cone 68 at a controlled temperature adaptable for the particular glass composition from which the tube is being drawn.

Molten glass "G" enters the rotating pan 64 of the rotating pan assembly 24 from the glass melting furnace 10 through the forehearth and refiner assembly 16 (FIG. 1) and feed channel 22, the entry of the molten glass occurring alongside the inner, platinum clad, inclined surface of the rim 66 of the pan assembly 24 as shown. The pan 64 is continuously rotating at a relatively slow speed of from about 1 to 10 rpm.

The molten glass, of the exemplary composition, as it enters the rotating pan 64 has a temperature of about 2,700° to 2,800°F. The molten glass flows underneath the lower edge of the flame shield or baffle 78 towards the center cone 68. The shield 78, being metallic and of minimal thickness, assumes the temperature of the molten glass and no appreciable temperature drop in the molten glass occurs because of the presence of the shield.

As the cup portion of the rotating pan 64 reaches its filled stage, the molten glass, which flows towards and upwardly on the cone 68, is permitted to adhere to the underside of the inverted saucer-like plate 224 of the bait assembly 222, which is then withdrawn upwardly from the cone 68 and slowly raised through the water cooler 84, having a crudely formed tube attached thereto. As the bait, with the crudely formed tube attached thereto, advances vertically upwardly from the center draw cone 68, a trumpet-like structure of molten glass is formed around the draw cone 68, which forms the root "R" of the tube being formed, and which is continuously replenished from the pan 64 since the tube is being drawn upwardly.

If desired, cooling air is then introduced through conduit 106 (FIG. 5), either at atmospheric pressure or at greater than atmospheric pressure, for flow through central passage 100 and upwardly through the interior of the formed tube T. Induced draft air flows through the water cooler 84 downwardly towards the rotating pan 64 along the outer surface of the glass tube T, which is being drawn upwardly through the water cooler. This induced draft air flow, as indicated by the arrows, then flows along the outer surface of the root portion R of the glass tube and over the top of the molten glass within the rotating pan 64 and upwardly to the atmosphere, the air being exhausted between the water cooler 88 and the internal surface of the cylindrical heat barrier 72.

By the arrangement of induced draft, cooling air flows internally and externally around and over the top of the molten glass in the rotating pan 64, the temperature at the surface of the molten glass in the pan 64 is reduced to about 2,500° to 2,600°F. and is further reduced at substantially the mid-section of the root portion R of the tube T (where the tube enters the water cooler 84) to between 2,300° and 2,400°F.

As mentioned previously, the success of the updraw process is largely dependent upon the temperature and the rate of heat removal from the molten glass in the pan 64 and from the root formation around the central draw cone 68 as the tube is being drawn upwardly. Theoretically, all the surfaces with which the molten glass comes in contact, i.e., the bottom and sides of the pan 64 and outer surface of the draw cone 68, are heat transfer surfaces through which heat losses can occur from the molten glass and these heat losses must be compensated for. Ideally, the molten glass should enter the pan at a temperature above the liquidus at which the log of the viscosity in poises is about 3.1 and should be maintained at this temperature everywhere except as it moves into the root portion of the tube surrounding the central draw cone. Thus, sufficient heat must be applied at the bottom of the pan so that the glass, as it flows along the bottom of the pan towards the central draw cone, is continuously maintained above the liquidus to prevent devitrification of the molten glass at the bottom of the pan and around the surface of the central draw cone.

The top surface of the glass, however, within the cylindrical flame barrier, directly underneath the water cooler, as the drawn tube enters the water cooler, must be quickly brought to a temperature below the liquidus, which is done by loss of heat to the water cooler and the induced draft air flow through and around the water cooler and over the top surface of the molten glass within the confines of the heat barrier.

Similarly, the inside of the tube at the root portion R being formed around the central draw cone where the glass departs from the top face 69 of the cone must be quickly brought below the liquidus to a temperature preferably lower than the temperature at the outside of the root portion R. In this particular instance using a particular glass composition, the temperature around the top 69 of the draw cone 68 where the glass leaves the cone surface, is brought down to between 2,200° and 2,300°F.

Rotation of the pan assembly 24 serves to equalize the temperature effects of the air currents in the area of the root R of the draw cone.

In the present improved apparatus the arrangement of the burners 44 and electrical resistance heating elements 260 (if used) provides effective heating of the molten glass and essentially only at places where it is needed, to thereby provide a more efficient heat transfer at the top surface of the glass. Additionally, by pouring the molten glass around the entire periphery of the pan, the molten glass as it flows inwardly towards the center draw cone to form the root of the tube, forms an almost perfect concentric, isothermal pattern. All the glass arriving at the root of the tube has been subjected to the same thermal history and is continuously thoroughly mixed by the attenuating action of the molten stream of glass as it enters the pan around the rim 66.

With further reference to FIGS. 2 and 4, the glass tube T, which is continuously rotating by means of rotation of the pan assembly 24, is drawn through the water cooler housing 84. The tube, which upper end is still attached to the bait 222 (FIG. 5a) is drawn through the water cooler and upwardly through the collector ring assembly 136 which is lowered in operating position by means of lowering the platforms 112 and 114 along the screw rods 120 into operating position. The bait assembly 222 is detached from the tube and swung out of place and the end of the tube is inserted between the draw rollers 210 which are rotating in opposite directions at a synchronized speed to take over the updraw movement of the tube T. The updraw rollers 210 are rotated at the proper required pulling speed and are adjusted relative to each other to prevent slippage between the draw rollers and the tube.

As previously described, the updraw roller assembly 168 (FIG. 4) is supported on a turntable 148, which is continuously rotated to rotate the draw rollers 210 around the upwardly drawn tube T which itself is likewise rotating as previously mentioned. The rotational speed of the turntable 148 is synchronized in speed and direction with the speed and direction of rotation of the pan assembly 24.

With still further reference to FIGS. 2, 3a, 4 and 8, the collector ring assembly 136 which rotates with the turntable 148 by means of the driven sprocket 150 attached thereto, is provided to supply power to motor 182 to drive drawing rolls 210, for spreading the rollers to accommodate various sizes of tubes, and for clamping the rollers to the tube being formed.

As most clearly seen in FIG. 4, the collector ring assembly 136 is made up of a plurality of collector rings 270 which are disposed in axially spaced, vertically stacked relationship by means of suitable spacers 272 interposed between adjacent collector rings 270. The assembly is held together by fastening means such as bolts (not shown) extending through both the collector rings and spacers. Attached underneath the stationary support plate 138 is a bracket 274, which extends axially outwardly along the entire length of the collector ring assembly. Mounted on the bracket 274 is a plurality of brush assemblies 276 spaced along the collector ring assembly 136 by means of a rod 278 attached to both upper and lower ends of the bracket 274. The number of brush assemblies may vary depending on the type of installation and power requirement and more than one stationary bracket assembly, supporting the brush assemblies, may be provided. Each of the brush assemblies 276 is in frictional contact with a selected rotating collector ring 270.

Thus, it will be seen from the foregoing description and with reference to the appended drawings, that an improved apparatus and process for the production of glass tubing or rods by the updraw method, has been provided, which is particularly adaptable to produce heavy wall glass tubing used for piping in the chemical processing industry. The present improved apparatus and process produces tubings or rods of higher quality and at higher speeds than possible with presently used conventional updraw methods and apparatuses. The present improved apparatus and process permits the production of glass tubing or rod from glass compositions that normally are extremely difficult or impractical to produce by the presently known conventional methods, such as for instance, tubings from easily devitrifiable glass compositions.

While the process and apparatus herein described can be utilized in drawing tubing and rod stock from any desired glass composition, the present invention is specifically adapted for use with readily devitrifiable glass compositions, such as the so-called "glass ceramics". Exemplary compositions which can be used in the process and apparatus of this invention include those compositions disclosed in U.S. Pat. No. 3,380,818, those compositions disclosed in U.S. Ser. No. 464,147 filed June 15, 1965, and corresponding British Patents Nos. 1,124,001 and 1,124,002, dated Dec. 9, 1968, and also those compositions disclosed in application Ser. No. 866,168 filed Oct. 13, 1969, and corresponding Netherlands printed Patent application 6,805,259.

It will be obvious to a person skilled in the art, that various modifications in detail, arrangement and construction of the present improved updraw apparatus may be resorted to without departing from the spirit and essential characteristic of the present invention as defined by the scope of the appended claims.

What is claimed is:

1. In an apparatus for drawing glass tubes or the like vertically upward from a pool of molten glass, the improvements of a refractory block having its upper surface contoured to provide a pool-containing pan having a central upstanding draw cone, an annular relatively shallow pool-retaining depression concentric with said cone, and a peripheral rim, combustion burner means radially outward of said rim directing combustion products around said rim and toward the lower portions of said block to immerse said entire block including said rim in the combustion products, thereby imparting heat to the glass in said shallow pool-retaining depression, and a flame shield interposed between said rim and said draw cone, said flame shield having an edge immersed in said pool of molten glass to provide an effective flame shield without substantially cooling said molten glass and means rotating said refractory block to evenly distribute the heat from said burner means to the glass within said shallow pool.

2. In an apparatus as defined in claim 1, the further improvement of a metallic cover superimposed on said refractory block and providing an erosion resistant, glass-contacting and combustion product-contacting surface for said block.

3. In an apparatus as defined in claim 1, a rotatable support spaced above said pan and in axial alignment with said draw cone, a plurality of draw rolls mounted on said support and rotatable relative thereto for engagement with the tube being drawn from said draw cone to elevate said tube relative to said pool, and means for rotating said support and the rolls carried thereby about the common axis of said draw cone and the tube being drawn.

4. In an apparatus as defined in claim 1, the further improvement of a cylindrical, water cooled chilling means axially aligned with said cone and located interiorally of said shield, the tube drawn from said cone projecting through said chilling means toward said draw rollers.

5. In an apparatus as defined in claim 4, the further improvements wherein said chiller is vertically adjustable relative to said draw cone to vary the chilling effect exerted thereby on the tube drawn from said cone.

6. In an apparatus as defined in claim 3, the further improvement wherein said support means is vertically adjustable relative to said pool of molten glass to vary the point of engagement of said draw rolls with said tubes being drawn.

7. In an apparatus as defined in claim 3, the further improvement of means for synchronizing the rotation of said pan and said support means to prevent the imparting of rotational strain to said tube being drawn.

8. In an apparatus as defined in claim 1, the further improvement of electrical resistance heating means directly underlying and in heat exchange relationship with the pool-retaining depression of said pan to accommodate additional heating of molten glass in said pan over and above the heating provided by said combustion burner means.

9. In a method of drawing glass tubes or the like vertically upwardly from the center of a pool of molten readily devitrifiable glass, the steps of introducing molten glass into a shallow insulated rotatable pan from a source adjacent the periphery of said pan, said rotatable pan having an upwardly opening shallow depression for retaining the pool of molten glass and an outer rim, rotating said pan relative to said source of molten glass to distribute glass uniformly around the periphery of said pan, enveloping the entire exterior of said pan including the rim and lower portions in the flames of a plurality of combustion burners to heat the pans and the glass retained therein, immersing a thin edge of an enveloping heat shield in said pool of molten glass to shield the entire portion of said pool from heat from said flames without substantially chilling said pool, and drawing a tube upwardly from the shielded center portion of the pool.

10. In a method as defined in claim 9, the further step of maintaining an essentially constant level of molten glass in said pan, thus maintaining a constant head of glass at the root of the tube being formed, to minimize surges and prevent variations in wall thickness of the tube being drawn.

11. in a method as defined in claim 9, the steps of passing the tube drawn from the center of said pool of molten glass upwardly through a cylindrical heat exchange element which is water cooled to chill the tube immediately after it is drawn from the center of said pool, and interposing an upward extension of said thin edge between the heat exchanger and the enveloping combustion flames.

12. In a method as defined in claim 11, the steps of engaging the tube in spaced relation above said pool with a plurality of draw rollers, driving said rollers to pull said tube upwardly relative to said pool, and rotating said rollers around the axis of the tube in synchronism with the rotation of said pan to avoid the imparting of peripheral twist to the tube being formed.

13. In a method as defined in claim 9, the further steps of inducing a flow of chilling air downwardly through said heat exchange means, across the surface of said pool inwardly of said flame shield and then upwardly from said pool to aid in chilling the tube during the initial stages of its drawing formation.

14. In a method as defined in claim 9, the step of imparting additional heat to the molten glass contained in said pan by means of electrical resistance heaters imbedded in said pan.

15. In a method as defined in claim 9, and wherin said pan is formed of a massive block of refractory material covered at its exterior with metallic covering, the further improvement of utilizing said block as a heat sink to uniformly distribute the heat of combustion to the molten glass in said pool.

16. In a method of drawing glass tubes or the like vertically upwardly from the center of a pool of molten readily devitrifiable glass, the steps of introducing molten glass into a rotatable pan from a source adjacent the periphery of said pan, said rotatable pan having an upwardly opening shallow depression including an outer rim for retaining the pool of molten glass and insulated lower portions, rotating said pan relative to said source of molten glass distributing glass uniformly around the periphery of said pan, enveloping the exterior of said pan including the rim and lower portions in the flames from a plurality of burners, thereby retaining the glass in the pan at an average temperature above liquidus, locally reducing the temperature of the molten glass near the center of the pan, at the outer periphery of the root of the tube being there continuously formed, to a temperature of no greater than the liquidus, and drawing the tube upwardly from the locally cool glass near the center of the pan at a rate sufficient to avoid devitrification of the locally cooled glass.

* * * * *